UNITED STATES PATENT OFFICE.

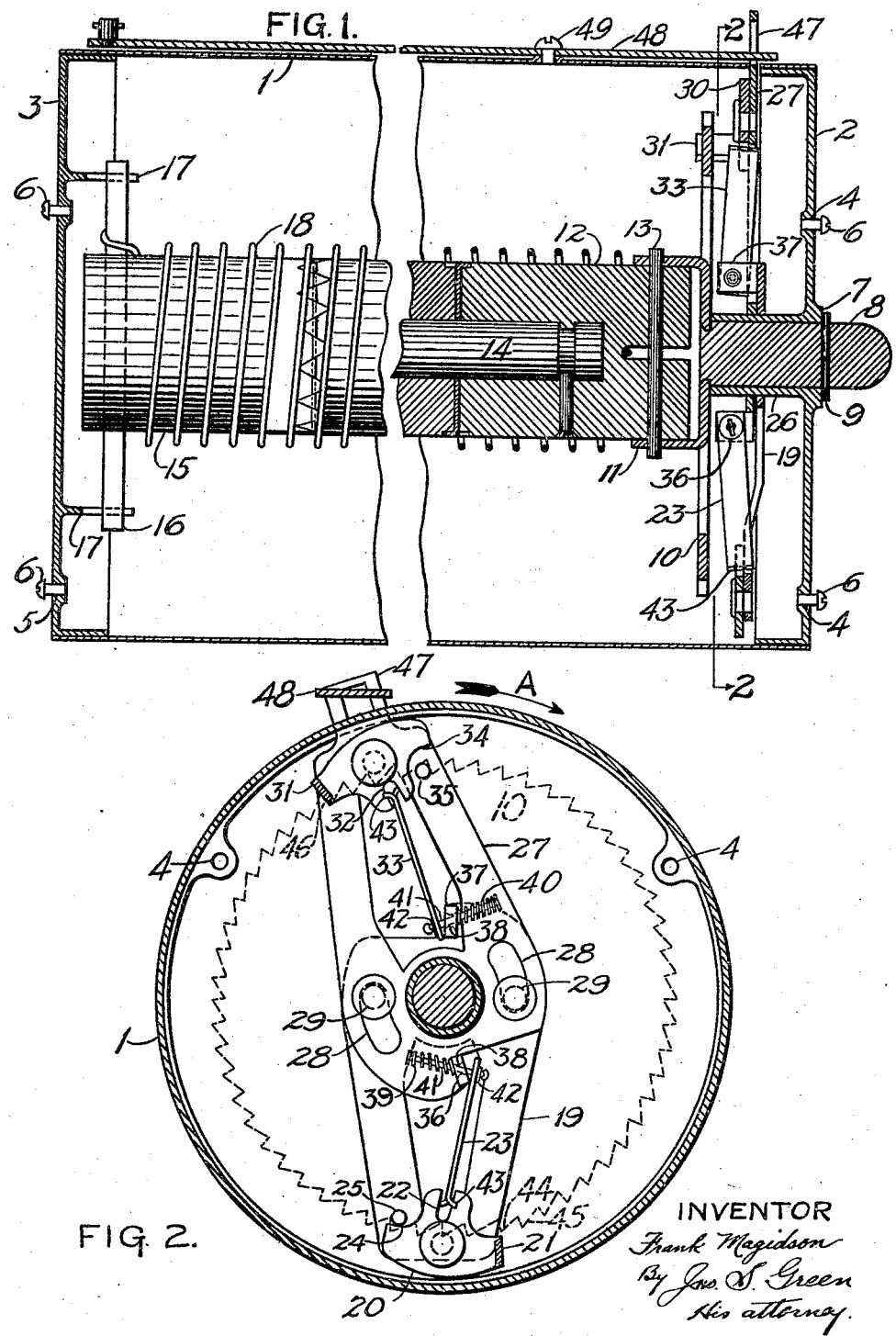

FRANK MAGIDSON, OF PITTSBURGH, PENNSYLVANIA, ASSIGNOR, BY MESNE ASSIGNMENTS, TO DAVIS AUTOMATIC CRADLE COMPANY, OF UNIONTOWN, PENNSYLVANIA, A CORPORATION OF PENNSYLVANIA.

SPRING-MOTOR MECHANISM.

1,420,048.     Specification of Letters Patent.    Patented June 20, 1922.

Application filed April 19, 1919, Serial No. 291,247. Renewed May 9, 1922. Serial No. 559,590.

*To all whom it may concern:*

Be it known that I, FRANK MAGIDSON, a citizen of the United States, and a resident of Pittsburgh, in the county of Allegheny and State of Pennsylvania, have made a new and useful Invention in Spring-Motor Mechanism, of which the following is a specification.

The object of my invention is to provide a silent and otherwise improved escapement and delivery mechanism for imparting a vibratory movement from a spring motor to a swinging object. The invention consists of improvements in the mechanism described and claimed in United States Letters Patent issued to me January 16, 1917 and numbered 1,212,786; 1,212,787 and 1,212,789.

In the drawing forming part of this specification, Fig. 1 is a longitudinal vertical section through a spring motor embodying my invention, when the mechanism is quiescent and Fig. 2 is a section on line 2—2 of Fig. 1 but showing the mechanism when at one extreme of its escapement motion.

The housing of the motor is a cylindrical casing 1 closed at its ends by caps 2 and 3 each provided with holes such as 4 and 5 to take screws 6 which attach the motor to the frame of the article upon which it operates; the motor shown being particularly adapted for automatic cradles.

Integral with cap 2 is a journal 7 for shaft 8 which is pinned at 9 to engage a crank handle, not shown, and to prevent inward movement of the shaft. Shaft 8 terminates in a large diameter ratchet wheel 10 having integral shoulders 11 which engage the end of a core section 12 secured against relative rotation by pin 13. Core section 12 is one of a series mounted upon an axis 14. Core 15 at the other end of the series is secured in place and against rotation with respect to the casing 1 by rods 16 seated in lugs 17 on cap 3. Around these core sections is coiled motor spring 18 attached at the left end to rod 16 and at the right end to core section 12 and through the latter transfers any energy it possesses to the toothed wheel 10 in the direction indicated by arrow A in Fig. 2.

Immovably secured to cap 2 is a pawl supporting arm 19. Pivotally secured to the end of arm 19 is a pawl 20 provided with the upstanding flange 21 adapted to engage the teeth of ratchet 10. Pawl 20 is slotted at 22 to receive pawl operating clip 23 and is provided with a pin engaging face 24. Face 24 limits the pivotal movement of the pawl flange 21 away from the ratchet by engaging a pin 25 which is mounted upon arm 19 and which may be of fibre, leather, rubber or other suitable material.

Pivoted on an inwardly projecting hub 26 on cap 2 is movable pawl supporting arm 27 extending in the opposite direction from fixed support 19 and limited in its movement by the ends of slots 28 engaging pins 29. Pivotally mounted near the upper end of this arm is a pawl 30, identical with pawl 20, having a tooth engaging flange 31, slot 32 which receives clip 33 and face 34 to engage pin 35.

On the inner ends of arms 19 and 27 are lugs 36 and 37 respectively, each provided with a transverse hole 38 countersunk on both sides of the lug. Against opposite sides of the respective lugs are coil springs 39 and 40 held under compression by a nail 41 headed at one end, passing through the spring coils, the lug, one end of the clip and a washer 42 and then enlarged to retain the washer. The tendency of springs 39 and 40 is to hold clips 23 and 33 on the center line of arms 27 and 19 respectively. The opposite end of each clip enters the slot in its respective pawl. When there is relative movement between either lug and the pawl connected therewith by one of the clips the tendency of the clip is to rotate the pawl on its pivot. This tendency may be resisted by the pressure of the ratchet teeth against the pawl flange or by the engagement of pawl face 24 or 34 with pin 25 or 35 respectively. When rotation of the pawls is so prevented, movement of arm 27 will move clips 23 and 33 with lug 37 and pawl 30 respectively; this movement of the clips being permitted by further compression of spring 39 and 40.

Clips 23 and 33 are split at their pawl ends with the split portion 43 bent at right angles to engage the upper and lower faces of the pawl adjacent the slot.

The upper end 47 of arm 27 engages one end of a lever 48 which is pivoted to casing 1 at 49. As the mechanism oscillates the free end 50 of this arm also moves and is adapted to oscillate a cradle or other object movably mounted on the frame to which the casing with its enclosed mechanism is attached. By changing the length of lever 48 or the location of its fulcrum 49, variations in the speed and movement of the swinging object will be obtained.

Operation: The mechanism is designed to oscillate arm 27 and lever 48 to and fro. Fig. 2 illustrates the position of parts when the mechanism is about to start. The arm 27 has been moved manually to the left. This movement has caused clip 33 to rotate pawl flange 31 into engagement with ratchet tooth 46. The ratchet 10 has been very slightly moved in the direction opposite to arrow A and this movement has released the previous pressure of ratchet tooth 44 on pawl flange 21 and the pressure of clip 23, fulcruming on the lower edge of lug 36, has immediately rotated pawl 20 to the position shown.

By releasing manual hold on the mechanism, spring 18 rotates ratchet 10 and arm 27 in direction of arrow A. The attending movement of lug 36 to the left causes clip 23 to rotate pawl 20 into engagement with ratchet tooth 45 and consequently interrupting the rotation of ratchet 10. The momentum of the body operated by the mechanism will move the arm 27 to the right a slight degree greater than the movement of the ratchet which will allow the pawl flange 31 to escape from tooth 46, being impelled thereto by the action of clip 33 then fulcrumed on the upper edge of lug 37.

The cradle or other body actuated by the mechanism will now be off center and its pendulous return to the position shown in Fig. 2 reverses the rotative tendencies on pawls 20 and 30, causing pawl 30 to engage tooth 50 in ratchet 10 and at the end of the return the momentum will relieve pressure of tooth 45 on flange 21 just as the manual starting of the mechanism relieved the pressure of tooth 44. The above described operations will be repeated as long as spring 18 retains energy.

The mechanism may be stopped at any time by arresting the oscillating body on its dead center and it will remain quiescent until again started.

The present mechanism has the advantage over means used in the previously mentioned patents obtained by me in that the coil springs 39 and 40 used herein to operate the pawl clips 23 and 33 are subjected to a minimum of transverse distortion and do their work under longitudinal compression for which they are best adapted. This avoids crystallization and fracture of the spring and distinguishes between a reliable and unreliable mechanism. Another advantage is gained by the use of the pins 25 and 35. As the limit to the action of the pawl flanges 21 and 31 away from the ratchet is just enough to disengage the ratchet teeth, the noise otherwise resulting is reduced and when the pin is nonmetallic it is scarcely audible. Silence in a cradle mechanism is an obvious advantage. The addition of the casing lever to the mechanism permits the operation of the swinging object at any point along its longitudinal center and by shifting the lever fulcrum permits any desired ratio between the movement of arm 24 and the swinging object. This arrangement also allows the mechanism, including the lever which operates the swinging object, to be assembled complete and adjusted or balanced at the factory and to be shipped as a compact unit.

I claim:—

1. An escapement mechanism comprising a spring impelled ratchet, a stationary arm, a pawl pivotally mounted thereon, an oscillating arm, a pawl pivotally mounted thereon, means adapted to pivotally move said pawls alternately out of engagement with said ratchet wheel at the end of successive oscillations of said oscillating arm, each of said arms being provided with a pin to limit the pivotal movement of the pawl mounted on that arm.

2. An escapement mechanism comprising a spring impelled ratchet wheel, a stationary support, a pawl pivotally mounted thereon, an oscillating support, a pawl pivotally mounted thereon, means adapted to pivotally move said pawls alternately into engagement with said ratchet wheel during successive oscillations of said oscillating support, and to move said pawls alternately out of engagement at the end of each successive oscillation, and means to limit said latter movement of said pawls.

3. An escapement mechanism comprising a spring impelled ratchet wheel, an oscillating arm, a stationary arm, respective pawls mounted on said arms, means adapted to alternately move said pawls into engagement with said wheel during successive oscillations of said oscillating arm and out of engagement at the end of the alternate oscillations, each of said arms being provided with means to limit the movement of its respective pawl out of engagement with said wheel.

4. An escapement mechanism comprising a spring impelled ratchet wheel, pawl supports, pawls pivotally mounted upon said supports, clips engaging said pawls, lugs cooperating with said clips to actuate said pawls out of and into engagement with said wheel and means tending to hold said clips in cooperating actuating position but permitting said clips to move out of said position when pivotal movement of said pawls is prevented.

5. An escapement mechanism comprising a spring impelled ratchet wheel, a fixed pawl support, an oscillating pawl support, pawls pivoted respectively on said supports and adapted to engage and disengage with said wheel, an actuating clip for each pawl engaged therewith at one end and flexibly secured to a lug at the other end; the lug for the clip of that pawl pivoted on the fixed support being adapted to oscillate with said oscillating support and the lug for the clip of the pawl pivoted on the oscillating support being immovable.

In testimony whereof, I have hereunto subscribed my name this 4th day of April, 1919.

FRANK MAGIDSON.